United States Patent [19]

Milford

[11] Patent Number: 4,827,531
[45] Date of Patent: May 2, 1989

[54] METHOD AND DEVICE FOR READING A DOCUMENT CHARACTER

[75] Inventor: Richard E. Milford, Oklahoma City, Okla.

[73] Assignee: Magnetic Peripherals Inc., Minneapolis, Minn.

[21] Appl. No.: 45,181

[22] Filed: Apr. 29, 1987

Related U.S. Application Data

[63] Continuation of Ser. No. 483,892, Apr. 11, 1983, abandoned.

[51] Int. Cl.[4] .............................................. G06K 9/46
[52] U.S. Cl. ......................................... 382/29; 382/7; 382/52; 382/62
[58] Field of Search ...................... 382/3, 7, 29, 62, 63, 382/52, 54, 13, 18

[56] References Cited

U.S. PATENT DOCUMENTS

| Re. 26,104 | 11/1966 | Glauberman | 382/29 |
| 2,919,426 | 12/1959 | Rohland | 382/62 |
| 2,947,971 | 8/1960 | Glauberman | 382/29 |
| 3,242,463 | 3/1966 | Baumberger | 382/62 |
| 3,503,043 | 3/1970 | Brass | 340/146.3 |
| 3,521,236 | 7/1970 | Parks et al. | 340/146.3 |
| 3,585,588 | 6/1971 | Hardin et al. | 340/146.3 |
| 3,629,829 | 9/1969 | Ardswer | 382/29 |
| 3,847,346 | 11/1974 | Dolch | 235/61.11 E |
| 3,930,230 | 12/1975 | Stephens | 340/146.3 AG |
| 4,163,213 | 7/1979 | Nadler | 382/62 |
| 4,245,211 | 1/1981 | Kao | 340/146.3 |
| 4,251,800 | 2/1981 | Sanner et al. | 340/146.3 |
| 4,286,255 | 8/1981 | Siy | 382/3 |
| 4,311,914 | 1/1982 | Huber | 250/556 |
| 4,398,177 | 8/1983 | Bernhardt | 382/62 |
| 4,468,704 | 8/1984 | Stoffel et al. | 358/282 |
| 4,497,066 | 1/1985 | Gasparri | 382/18 |
| 4,561,105 | 12/1985 | Crane | 382/13 |

FOREIGN PATENT DOCUMENTS 1015886 1/1966 United Kingdom.

Primary Examiner—Leo H. Boudreau
Assistant Examiner—Joseph Mancuso
Attorney, Agent, or Firm—Bill D. McCarthy

[57] ABSTRACT

A method and device for reading and recognizing an unknown character on a document, the device measuring the character's waveform amplitude along timed intervals and determining that each measurement is within a predetermined acceptable amplitude range at each interval for an ideal character. If all of the measurements of the amplitude are within the acceptable ranges, a recognition signal of the character is generated.

12 Claims, 5 Drawing Sheets

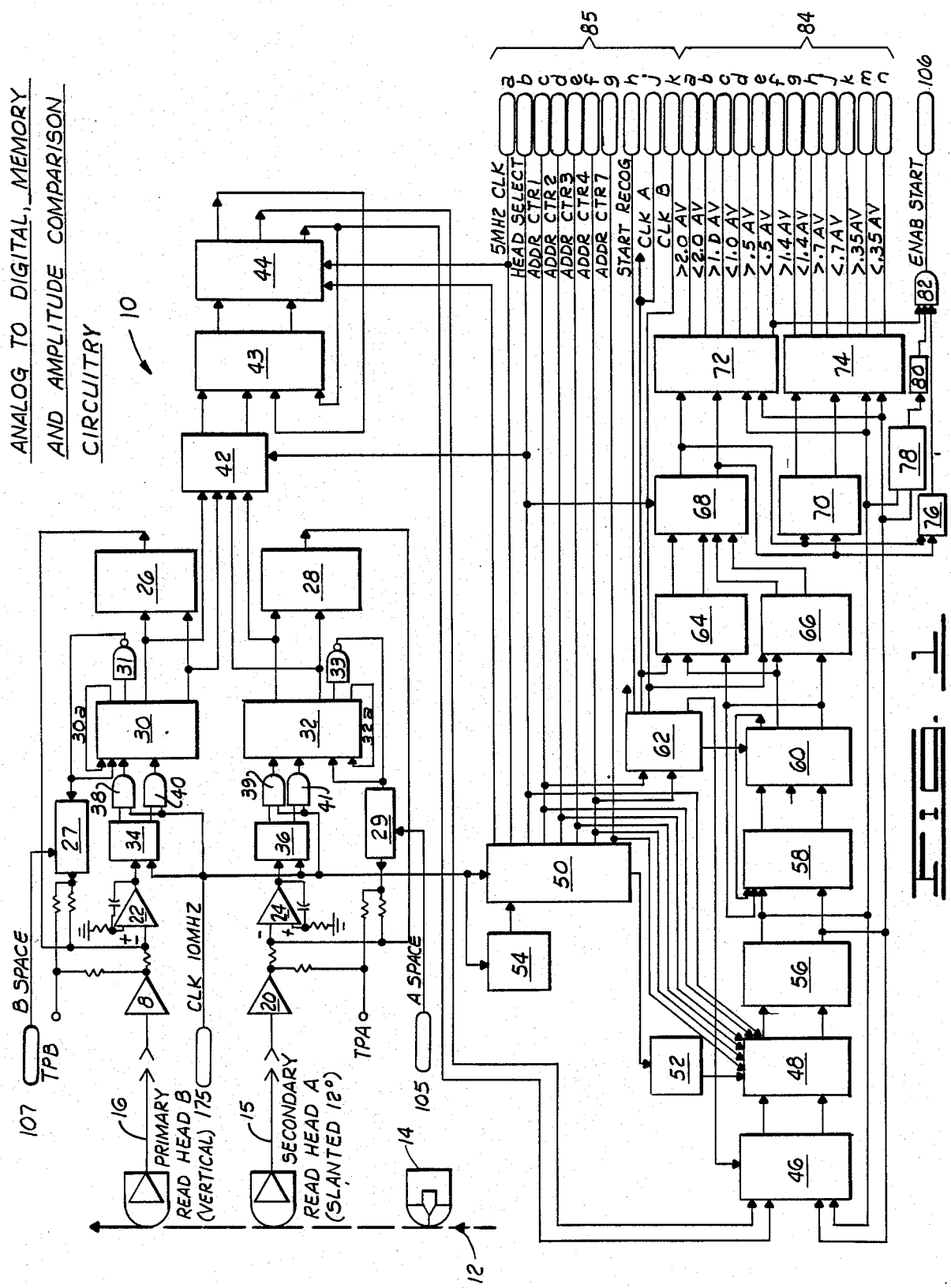

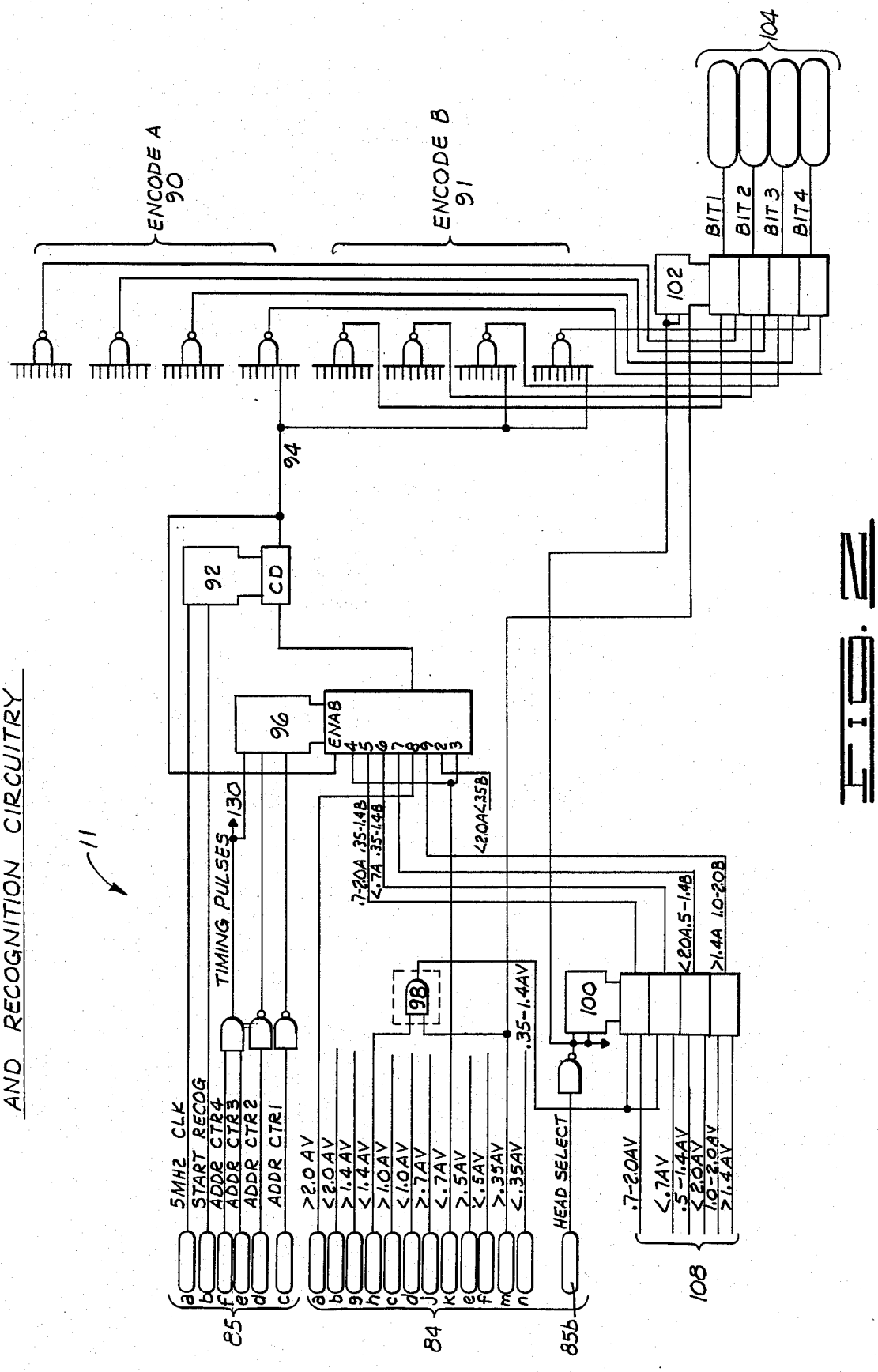

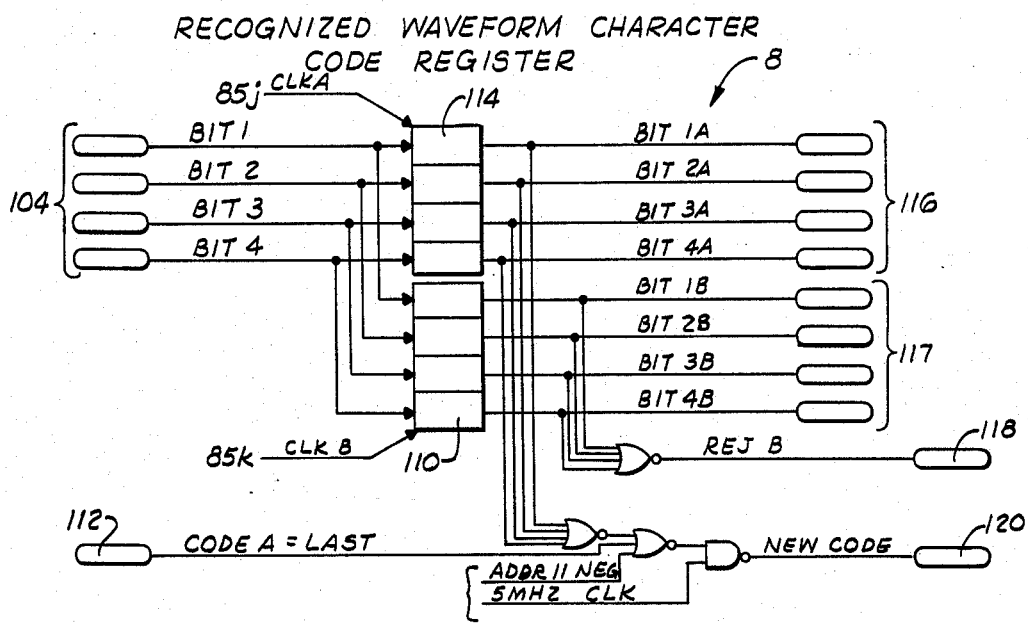
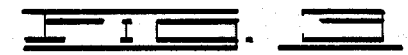
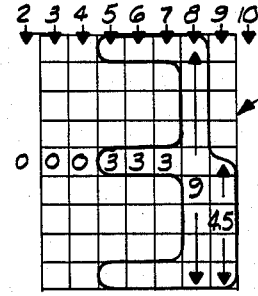
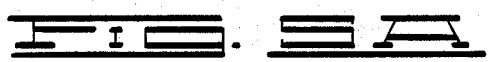
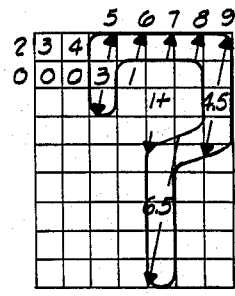
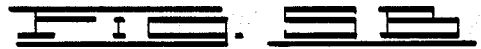

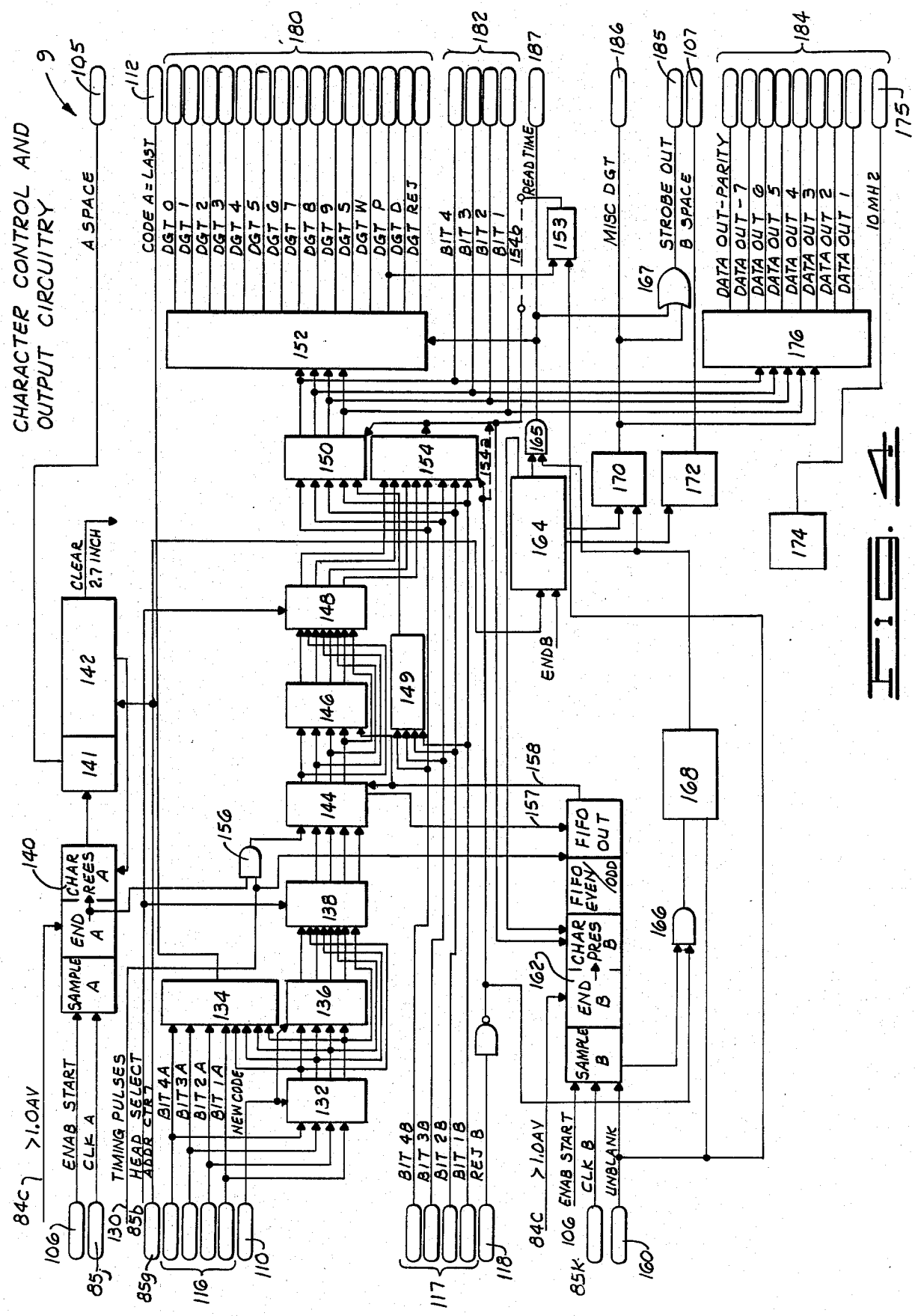

METHOD AND DEVICE FOR READING A DOCUMENT CHARACTER

This application is a continuation of application Ser. No. 483,892, filed Apr. 11, 1983, now abandoned.

BACKGROUND OF THE INVENTION

This invention relates to a method and device for reading characters on a document and more particularly but not by way of limitation to a method and device for reading unknown magnetic or optical characters on bank documents. The device measures the unknown character's waveform amplitude along timed intervals and determining that each measurement is within a predetermined acceptable amplitude range at each interval for an ideal character.

Heretofore there have been various types of character recognition devices such as the character recognition system described in British Pat. No. 1,015,886. Also there are various types of character reader systems described in U.S. Pat. No. 3,503,043 to Brass, U.S. Pat. No. 3,521,236 to Parks et al, U.S. Pat. No. 3,585,588 to Hardin et al, U.S. Pat. No. 3,847,346 to Dolch and U.S. Pat. No. 3,930,230 to Stephens. None of the above patents describes nor discloses a method or device which defines acceptable amplitude tolerance ranges at each phase point along the waveform of an unknown character to be sensed in determining for character recognition. The advantages and unique features of the present invention are described as follows.

SUMMARY OF THE INVENTION

The present invention achieves misread performance equal to a multi-channel (two-dimension) type reader but uses only two single channel read heads having advantages of better signal/noise ratio and at a lower cost. Further, the device uses improvements where entirely digital recognition logic is used rather than an analog voltage comparator scheme.

The device uses a waveform recognition system where the average level and factors of average level of the unknown waveform are calculated as range limit comparison references. The unknown waveform amplitudes at timed intervals along the waveform are compared with the range limit comparison references. "Less than" and "greater than" comparison outputs are pre-wired to define an acceptable amplitude tolerance ranges at each phase measurement along the waveform for each of the ideal characters in the set to be read. A collection of the measurements having amplitudes within defined ranges provides a recognition signal of the waveform.

For certain characters, such as E13B symbols, a character code output is given if the respective waveform is recognized at only one phase time by the vertical read head system. For character 8, the logic requires waveform recognition at two phase times in order to allow a character 8 code output. For other characters, the character recognition device combines outputs from two single dimension waveform recognition systems. Each system views the unknown character in a different orientation by its read head, thus giving a two-dimensional effect in the resultant character identification. Possible characters are identified by a secondary waveform recognition system at different phase times during a broad sample time. Possible character codes from the secondary system are stored and later compared with any number of possible character codes from the primary waveform recognition. A character code match results in a final character code output and a no character match results in a rejected character code output.

Further a magnetic ink recognition read head or an optical character recognition read head may be used along with other types of sensing means. Also two parallel systems using different sensing means may be used to sense the same unknown character and the outputs thereof subsequently compared to yield an improved final character identification output.

The device for reading and recognizing an unknown character on a document includes at least a primary read head at one orientation for reading the document character as the document passes thereby. A waveform is produced from the unknown character sensed and the amplitude of the waveform is measured along timed intervals. The waveform amplitude at each interval is compared with several factors of average amplitude calculated from the sum of amplitudes for the waveform being read. For each interval, selected comparison outputs are pre-wired to define acceptable amplitude tolerance ranges. If selected comparison outputs are all true as collected for a given character, then a signal of a recognition of that character is outputted. The range limit comparison references change in magnitude proportional to the amplitude measurements; consequently, a wide variation in waveform signal level is tolerated.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a logic block diagram of analog to digital, memory and amplitude comparison circuitry.

FIG. 2 is a schematic drawing of one typical comparison output collection and recognition circuit.

FIG. 3 is a schematic drawing of the E13B font recognized waveform character code register.

FIG. 4 is a logic block diagram of the E13B font character control and output circuitry.

FIG. 6 illustrates the waveform signal of the character three shown in FIG. 5A and illustrating a reading in a magnified time scale of a portion of the waveform along a timed interval.

DETAILED DESCRIPTION OF THE DRAWINGS

Figure 5:
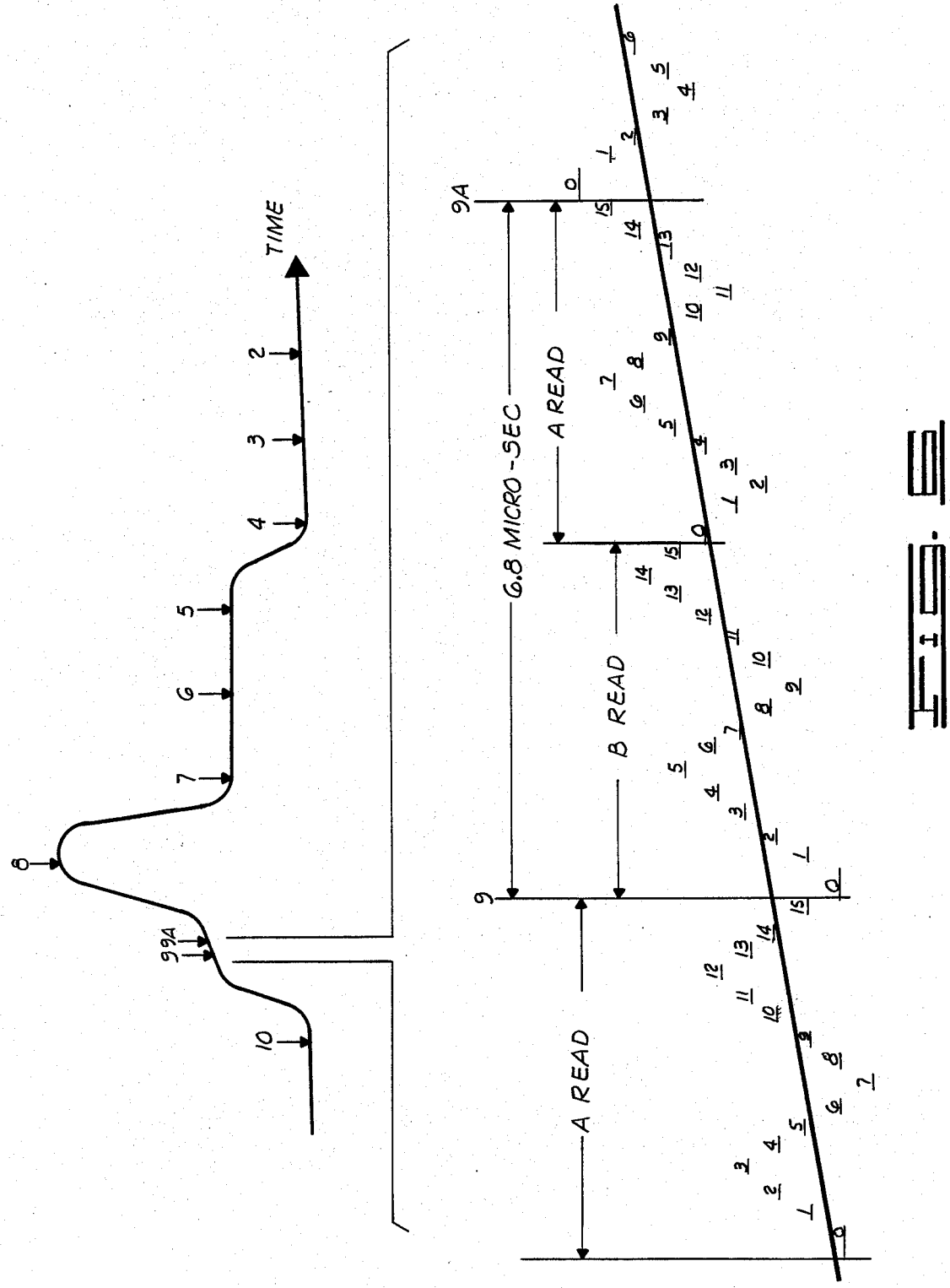
FIG. 5A illustrates the reading of the character three in an E13B font with the read head in a vertical orientation.
FIG. 5B illustrates the reading of the character seven in an E13B font with the read head in a slant orientation.

In FIG. 1 a logic block diagram shows the analog input to digital amplitude conversion, memory storage of data and amplitude comparison designated by general reference numeral 10. A document indicated by arrow 12 may be in the form of a bank check, bank note or any other document using unknown magnetic or optical read characters such as ideal characters found in an E13B font or the like. The document 12 passes in front of a write magnetic head 14 and then proceeds past a read head A which is slanted at an angle from the vertical and more particularly at an angle of 12 degrees from the vertical. After the document passes read head A it passes read head B which is in a vertical position. It should be kept in mind, while the device 10 is discussed having a read head A at 12 degrees from the vertical and read head B in a vertical mode, the two read heads can be at other orientations and accomplish the same purpose.

The read heads A and B produce analog signals corresponding to the characters of information on the document. Each head passes its signal through separate channels 16 and 15 of the circuit. Amplifiers 18 and 20 amplify the signals and deliver signal currents into minus inputs of analog voltage comparators 22 and 24. Also delivered to the minus inputs of 22 and 24 is current feedback from the output of digital to analog converters 26 and 28 (ICs MC1408). The plus inputs of comparators 22 and 24 have small regenerative voltages applied from the output of the comparators. The digital to analog converters 26 and 28 deliver a current proportional to binary counts of counters 30 and 32 (ICs 74193) equal and opposite to signal currents. A small difference in currents cause outputs from 22 and 24 to switch flip-flops 34 and 36 (IC 74175) between the up and down counting of counters 30 and 32 via gates 38, 40, 39, 41 (IC 7400).

The up and down counters 30 and 32 track the incoming analog signals at all times and each produces an eight bit digital output into a multiplexer 42 (ICs 74157). FIG. 6 illustrates the way binary count steps follow an analog waveform between times 9 to 9A. The counter "hunts" above and below input signal at a 10 MHz count rate.

Counters 30 and 32 have the last carry output of ICs 74193 wired back to their load inputs via 30A and 32A. The parallel load data inputs are all logic highs, which causes the counters to hold the maximum all 1's count in the event the analog signal goes higher then the maximum count limit.

Similarly the borrow outputs connect back to the counter reset inputs via gates 31 and 33 to prevent the counters from going lower than all 0's count. While at 0 count, borrow count down pulses are rectified and charge a capacitor in special circuits 27 and 29. These circuits provide zero adjustment analog feedback current into the minus inputs of 22 and 24. At the end of each unknown waveform, this feedback adjusts to the analog signal level such that 0 count represents the start of the next unknown character waveform. The time constant of these circuits is modified by logic feedback B SPACE and A SPACE when an absence of unknown character waveforms has been logically determined. Note test points TPB and TPA display a zero corrected unknown waveform proportional to the digital count amplitude output. The actual analog input waveform may have low frequency variations such as 60 hertz noise removed by this technique. The accuracy of subsequent digital recognition depends on the unknown waveform being properly referenced to binary 0 count.

A multiplexer 42 samples each channel 15 or 16 in rotation and passes the resulting eight data bits to following digital logic circuits which are time shared between the two read heads. As shown in FIG. 6, each read head shares the circuit on alternate 3A microsecond periods.

An averaging circuit, consisting of an adder 43 (ICs 74283) and register divider 44 (ICs 74174) adds the amplitudes sampled at sixteen clock times and divides the total by 16 to get an average amplitude to be loaded into memory. As seen in FIG. 6 the counters go two or three counts above or below target value before changing the count direction. Possible "hunting" error is corrected by this averaging technique.

A multiplexer 46 (ICs 74157) loads the resulting eight bit number into a memory 48. Timing to the memory 48 is provided by address counter 50 (IC 74393) and memory write control 52 (ICs 74109, 7427, 7410). A new byte of amplitude is stored in the memory for each read head once each 0.0016 inch of document travel past the read heads A and B. The memory is arranged to operate like a dynamic shift register where at address step 0 a new data byte input is selected by multiplexer 46. At address steps 1 through 15, multiplexer 46 selects recirculated data bytes from memory output register 56 to be written back into memory 48. The 256 bytes of RAM contain eight phase samples per 0.013 inch stroke width and 16 samples points along the unknown waveform for each read head. Timing is arranged by skip time control 54 (ICs 74175, 7427) to present memory output data in register 56 (ICs 74174) in successive samples spaced 0.013 inch (nominal stroke width of E13B font) apart. Thus in FIGS. 5A and 5B the numbers at top represent detailed address steps 2 thru 10 of 16 total steps 0 through 15 seen in FIG. 6. Note the widest waveform is contained within 2 through 10 address steps. Each set of measurements is acted upon by subsequent recognition logic to attempt unknown waveform recognition. After a short (0.0016 inch) phase delay later another set of measurements denoted by 9A etc. in FIG. 6 is presented for the next waveform recognition attempt. Also, the second read head data is operated in an alternate time shared fashion. FIG. 5A show amplitude samples of character 3 by vertical read head B. FIG. 5B shows amplitude samples of character 7 by slanted read head A. Although processed by the same circuits, head B data is separate and independent of head A data. Head B produces the primary waveform, head A produces the secondary waveform.

The memory may be RAM or dynamic shift registers (ICs 1402A) 8 bits×256 bytes. In the case of a dynamic shift register an example would be to use a 10 megahertz clock frequency with a free running address counter controlling access. The document transport speed is 240 inches per second. By design, the time through the 256 bit dynamic shift register is made to correspond with one stroke width (0.013 inch) at the 240 inches per second transport rate. The output will recirculate in such a way that successive output bits represent 16 waveform samples spaced by one stroke width each.

Access is controlled to alternate between the two read heads A and B input sharing the memory 48. Every 0.013 inch divided by eight phases equals 0.0016 inch of document travel, the load cycle is repeated. Read head B amplitude byte is averaged during read head A time period and is loaded and the 16th recirculated byte is deleted at address 0 at start of read head B period in FIG. 6. For the next 5 byte times previously stored outputs corresponding to read head B are recirculated via the multiplexer 46. A 17th time period occurs during address 0, but is skipped as an effective memory address. Thus address 0 period is 400 nano-seconds while other address periods are 200 nano-seconds.

After each recirculation through the memory 48, the data bytes are all moved by address position and continuously repeating recognition attempts are made on each set of shifted phase data.

The first step in recognition is to calculate the primary and secondary average levels by adder 58 (ICs 74283) and register 60 (ICs 74174). This calculation is performed on each set of data when located at addresses, one shift position in advance of the position where the same data set will be compared with range limit comparison references. Two registers (ICs 74174) 64 for read head A and 66 for read head B store the result of the primary and secondary average levels calculation while comparisons are made. Multiplexer 68 (ICs 74157) selects the appropriate read head stored average level in order that the following circuitry can be time shared in use between the two read heads.

Multiplexer 68 outputs address a PROM 70 (ICs 5603) programmed to give an output which is a 0.7 multiply factor of the address input. This provides a fast multiply function. Outputs from 68 to 70 compare reference inputs for the following range limit comparison references: 2.0 AV, 1.0 AV, 0.5 AV, 1.4 AV, 0.7 AV and 0.35 AV, where AV is the average level of amplitude of the unknown waveform.

The next step is digital comparison of each data byte from memory output register 56 with stored factors of the average level from 68 to 70. Comparators 72 and 74 (ICs 7485) perform this function and deliver a group of comparison outputs 84 to be selectively collected by recognition circuits. This group of comparison outputs defines the amplitude of current data byte relative to the range limit comparison references level at each address step along the waveform.

Also delivered to recognition circuits is address step control signals from counter 50 and address decodes 62 (ICs 7442, 7400, 7410). These address and timing signals are collectively identified as 85. Also an "enable start" control signal 106 is a logic function generated by gate 82 (IC 7427) flip-flop 80 (IC 74175) and minimum peak decode gate 78 and minimum average decode gate 76 (IC 74260).

In FIG. 2 one typical comparison output collection and recognition circuit 11 is shown. This circuit is multiplexed for recognition of ideal character 7A (secondary waveform) and 3B, (primary waveform) which are shown in FIG. 5B and FIG. 5A. The complete recognition wiring for all E13B font characters is presented in the Table of Recognition Wiring shown in the last page of the Detailed Description of the Drawings. All recognition circuits work in the same way as the representative circuit described as follows.

Address and timing signals 85 are inputs to multiplexer 96 (IC 74151) and recognition flip-flop 92 (IC 74174). Continuous free-running recognition attempts are made each 3.4 micro-seconds alternating between read head A and read head B. At address 0 a "START RECOG" signal resets flip-flop 92 to a low level output indicating recognition of the ideal character if and only if the output remains low after cycling through address steps 2 through 9. Output 94 at a low level enables multiplexer 96. One multiplexer input at a time is selected by "ADDR CTR" outputs. The selected input at each address step is indicated by number 2 through 9 shown on multiplexer 96. At each address step (200 nano-second duration) a logic high input allows flip-flop 92 output to remain low after clocked by "5 MGZ CLK" signal. If a logic low signal is present at any input when it is selected, then flip flop 92 output 94 goes high indicating non-recognition. Output 94 high disables multiplexer 96 for the remainder of the recognition cycle.

Inputs to multiplexer 96 are all derived from comparison outputs 84 which define the amplitude of the current data byte relative to range limit comparison references level at each address step. Typical range gate 98 (IC 7408) will have a high level output if the current data byte has an amplitude which is greater than 0.35 and less than 1.4 relative to average level amplitude. Thus this output is denoted 0.35-1.4 AV. Some range signals are multiplexed in order that two characters, in this case characters 7A and 3B, may share the same recognition circuit. HEAD SELECT signal 85b controls multiplexer 100. For example, the top section has inputs 0.7-2.0 AV and 0.35-1.4 AV and output 0.7-2.0 A and 0.13-1.4 B. This output is wired to address step 5 input. While attempting to recognize character 3 by read head B, address step 5 must have a data byte whose amplitude is greater than 0.35 and less than 1.4 relative to average level in order to be high.

The recognition requirement is established by the physical wiring of the circuit. It is pre-determined from the anticipated waveform for character 3 (see FIG. 5A) that the ideal character 3 should have an amplitude 3 units high at address 5. For character 3, the average amplitude is 2.8 units and the theoretical ratio to average level is 1.1 at address 5. Thus a nominal value of 1.1 would satisfy the range tolerance of 0.35-1.4 wired in this case.

Looking at character 7 in FIG. 5B, the address 5 amplitude is 3 units high and average level of 2.0 units is anticipated. A nominal ratio of 1.5 at address 5 would satisfy the range tolerance of 0.7-2.0 wired in this case.

This example may be found at row 5, column 4 in Table of Recognition Wiring. Note the physical IC location and pin number is 5E-13, the characters are identified as 7A/3B and the tabulated requirement 0.7-2.0/0.35-1.4.

The complete requirements for recognition of 3B waveform are:

$$\frac{2}{<.35} \quad \frac{3}{<.5} \quad \frac{4}{<.5} \quad \frac{5}{.35\text{-}1.4} \quad \frac{6}{.35\text{-}1.4}$$

$$\frac{7}{.5\text{-}1.4} \quad \frac{8}{>2.0} \quad \frac{9}{1.0\text{-}2.0} \quad \frac{10}{<.35}$$

and the theoretical amplitude to average ratios of FIG. 5A are:

$$\frac{2}{0} \quad \frac{3}{0} \quad \frac{4}{0} \quad \frac{5}{1.1} \quad \frac{6}{1.1} \quad \frac{7}{1.1} \quad \frac{8}{3.2} \quad \frac{9}{1.5} \quad \frac{10}{0}$$

This correlates with the typical character 3B waveform shown in FIG. 6.

A low output 94 signaling waveform recognition encodes a 4 bit character 7 code via wiring into gate 90 for read head A. For read head B, wiring into gates 91 encodes a character 3 code. Multiplexer 102 delivers the four bit outputs on lines 104 which go into register 114 for read head A or 110 for read head B in FIG. 3. The Character Code Register is identified by reference 8. These registers are clocked at address 10 time; consequently, the signal ">0.35 AV" wired into multiplexer 102 will disable 102 and produce a non-recognition or reject code if the data byte at address 10 time is not equal to or less than 0.35 relative to average level.

In the Table of Recognition Wiring, the E13B font symbols are identified by D—dash, S—slant or dollar amount symbol, W—window or transit field symbol, and P—paragraph or ON-US symbol. This implementation uses only the vertical B read to identify characters 0, 8, D, S, W, P. Only one recognized character code will be encoded for read head A or read head B on any given recognition attempt. However, at another phase time of the same waveform, a different recognized character code could be encoded. Logic in FIG. 4, character control and output circuits 9, are structured to determine when a character is present, to time a sample period for accepting recognized character codes, and to compare character codes generated by read head A with codes generated by read head B under certain logic conditions where it is desired to avoid a "misread" or incorrect character code output. The second dimension view of slanted head A provides improved misread performance if character waveforms have been degraded for example by added or removed ink.

A description of character control and output circuitry 9 in FIG. 4 is as follows. In FIG. 4, boxes 140 and 162 are character control flip flops (IC 74109) for the A and B reading respectively.

Note in FIG. 1, the A READ is first in the transport, but is secondary because it may not be used under certain logic conditions. The B READ is physically located second in the transport, but is the primary reader. In either case an ENAB START signal 106 determines via gate 76 that a minimum average amplitude is present in the waveform to be valid character, gate 78 that a minimum peak amplitude was measured and set flip flop 80, and the current amplitude at address 10 time is less than 0.5 average level.

The SAMPLE A flip flop of 140 is set if ENAB START is true, CHAR PRES A flip flop is false and a clock 85 j "CLK A" occurs at address 10 time. SAMPLE A allows register 132, 135 (ICs 74174) to be loaded with two character recognition codes 116 from register 114 in FIG. 3. A NEW CODE signal 120, sourced in FIG. 3, generates a pulse at address 11 time if register 114 contains any code except reject or non-recognition code and the code A is not equal to the last code received in register 132. Note CODE A=LAST signal 112 comes from comparator (IC 7485) 134 in FIG. 4. If no new code is recognized during SAMPLE A, then registers 132 and 136 will contain the reject code. Each time a new code loads into 132, the code in 132 transfers into 136. Therefore, at END A sample, the last two new codes will remain stored in 132 and 136. Flip flop END A is set when an amplitude greater than 1.0 AV signal 84c occurs at address 10, CLK A time. Both END A and SAMPLE A will terminate at the next CLK A time.

During END A period two timing pulses 130 via gate 156 will load both codes from 132 and 136 through multiplexer 138 into a FIFO buffer (IC 3341) 144. These codes will remain in buffer storage until the B reader reads the same character later in the transport.

The END A flip flop sets CHAR PRES A flip flop which remains true for a timed period determined by time counter 142 (ICs 74393). At the end of CHAR PRES A if next sample A does not begin within a time also determined by 142, then latch 141 (IC 74279) A SPACE is set. This latch will be reset on next SAMPLE A. Signal A SPACE 105 controls time constant as previously described.

Time counter 142 is reset each END A, but may count a long time period after the last A read character is sensed. As implemented in this design, the distance between A read head and B read head is 2.5 inches. In this case after a time of transport corresponding to 2.7 inches, a clear signal from 142 resets FIFO 144 and other flip flop associated with Read A.

The SAMPLE B flip flop of 162 is set if ENAB START is true, CHAR PRES B flip flop is false, an UNBLANK signal 160 signals that a document is present at read head B, and a clock signal 85 "CLK B" occurs at address 10 time. SAMPLE B allows B character code signals 117 to be loaded into output register 150 (IC 74175) under logic conditions to be explained later. Flip flop END B is set when signal 84c"1.0 AV" is true at CLK B address 10 time. If no B waveform is recognized during SAMPLE B time, then a reject code output will result. Both END B and SAMPLE B will terminate at the next CLK B time.

Two flip flops 162 FIFO EVEN/ODD and FIFO OUT control output from the FIFO buffer 144. Two codes are extracted from the buffer for each character B read. Signals output ready 157 and FIFO OUT 158 along with other logic gating not shown cause the first A code to load into register 146 (IC 74175). Multiplexer 148 then presents both the first A code and in turn the second A code at the output of the FIFO for comparison with each B code into comparator 154 (IC 7485).

Box 149 represents a logic gating and latch (ICs 7400, 7410, 74279) which function to inhibit loading the first character 8 recognition B code into register 150 during SAMPLE B.

Three wiring options are provided, one of which is represented by dashed line 154a. This option by-passes the use of comparator 154 and hence Read A entirely. This mode allows the reader to function with only the vertical B read head. In this case the first B code (except character 8) during SAMPLE B sets the output code register B and also sets CHAR PRES B flip flop. Any recognized B code other than REJ B via signal 118 initiates this function. Time Counter 164 (IC 74393) determines the duration of CHAR PRES B.

The second wiring option requires a character code A match with code B via 154 for characters 1, 2, 3, 4, 5, 6, 7, 9 only before code register 150 is set. This option applies over the entire document being read.

A third wiring option represented by dash line 154b uses latch 153 (IC 74279) to enable the second mode from the start of the document until ON-US symbol P is recognized, then the first B only mode is enabled for the remainder of the document. This logic gives misread protection for the first two fields on bank checks, and less protection on later fields where check digits are present.

Latch 168 and gate 166 (IC 7400) is an enable control on READ TIME gate 165. A recognized B waveform code must occur during SAMPLE B before any output character is allowed. Thus, a leading edge reject character, sometimes false or noise induced, is inhibited by this logic.

Time counter 164 also controls generation of B SPACE signal 107 via latch 172 in the same way A SPACE was generated.

Another counter 170 (74393) generates one MISG DGT pulse 186 upon each first absence of a character after each sequence of consecutive characters.

A READ TIME output 187 is generated during each CHAR PRES B time. This signal is ored with MISG DGT signal 186 to provide STROBE OUT signal 185. Individual character digit outputs 180 are provided by coder 152 (ISc 74155).

The four bit character code output is available on signal lines 182.

Prom 176 encodes a 7 bit with parity ASC II data code output 184 for the E13B font characters read. A space code is encoded when STROBE OUT is due to MISG DGT pulse 186.

Box 174 is a 10 megahertz clock oscillator source outputted on line 175.

TABLE OF RECOGNITION WIRING

| | | IC PIN NO. | | | | | | |
|---|---|---|---|---|---|---|---|---|
| | | 3 | 4 | 12 | 13 | 14 | 15 | 1 | 2 |
| | | | | | ADDR | | | | |
| | | 2 | 3 | 4 | 5 | 6 | 7 | 8 | 9 |
| 5A | 9A/9B | $\leq.7$/<.5 | .7–2.0/<.5 | <1.0/1.0–2.0 | <1.0 | <1.0 | $\leq 2.0$/<1.0 | >1.4 | .7–2.0/>2.0 |
| 5B | OB | <.5 | >1.0 | <1.0 | <1.0 | <1.0 | .35–1.4 | .35–1.4 | .35–1.4/>1.4 |
| 5C | 6A/6B | $\leq.7$/<.5 | .7–2.0/<.5 | >1.0/>2.0 | .35–1.4 | .7–2.0/.35–1.4 | <1.0/1.0–2.0 | .35–1.4/.35–1.0 | 1.0–20 |
| 5D | 5A/5B | $\leq.7$/<.5 | $\leq.7$/<.5 | >1.0/<.5 | .35–1.4/>1.4 | .5–1.4 | .7–2.0/.7–1.4 | .7–2.0 | >1.0/>1.4 |
| 5E | 7A/3B | <2.0/<.35 | <.5 | <.5 | .7–2.0/.35–1.4 | $\leq.7$/.35–1.4 | <2.0/.5–1.4 | >2.0 | >1.4/1.0–2.0 |
| 5F | 4A/4B | $\leq.7$/<.5 | >1.0/<.5 | >1.4 | .35–1.4/>1.4 | $\leq.7$/<.5 | <1.0 | 1.0–2.0 | .7–2.0 |
| 5G | 2A/1B | $\leq.7$/<.5 | <.5 | <.35 | $\leq 2.0$/<.35 | >1.4 | .7–2.0/>2.0 | >2.0/.7–2.0 | <1.0/1.0–2.0 |
| 5H | 1A/2B | $\leq.7$/<.5 | <.5 | <.5 | .35–1.4/<.5 | >2.0/>1.4 | 1.0–2.0/.7–2.0 | 1.0–2.0/.7–2.0 | >1.0/>2.0 |
| 5J | DB | .7–2.0/<.5 | 1.0–2.0 | 1.0–2.0 | .7–2.0/<.5 | 1.0–2.0 | 1.0–2.0 | .7–2.0/<.5 | 1.0–2.0 |
| 4B | 7B | .7–2.0/<.5 | .7–2.0/<.5 | .7–2.0/<.5 | .7–2.0 | <1.0 | >2.0 | <2.0 | >1.4 |
| 4E | 8B | >1.0/<.5 | .5–1.4 | >2.0/>1.4 | <1.0 | .35–1.0 | *.35–1.0 | >2.0/>1.4 | .7–1.4 |
| 4F | SB | .7–2.0/<.5 | >1.0 | >1.0 | >1.0/<.5 | >1.0 | >1.0/<.5 | >1.0 | .7–2.0 |
| 4C | 3A/WB | $\leq.7$/<.5 | $\leq.7$/1.0–2.0 | $\leq.7$/1.0–2.0 | .35–1.4/<.5 | <2.0/<.35 | >1.4/1.0–2.0 | >1.4/1.0–2.0 | 1.0–2.0 |
| 4H | PB | >1.0/<.5 | >1.0 | >1.0/<.5 | .35–1.4/>1.4 | >1.0/<.5 | 1.0–2.0/.7–2.0 | 1.0–2.0/.7–2.0 | 1.0–2.0/.7–2.0 |

↑ ↑— CHARACTER
⌊— IC LOCATION

*MAY BE SWITCHABLE TO .5–1.4

Changes may be made in the construction and arrangement of the parts or elements of the embodiments as described herein without departing from the spirit or scope of the invention defined in the following claims.

What is claimed is:

1. A method of reading unknown document characters with respect to ideal characters having ideal waveforms, the method comprising:
   predetermining acceptable tolerance ranges of amplitude to average level ratios at each interval along the ideal waveform for each ideal character;
   sensing the unknown character with a primary read means at one orientation as the document passes thereby;
   producing a primary waveform from the unknown character sensed;
   measuring the amplitudes of the primary waveform along intervals thereof;
   calculating the primary average level of the amplitudes of the primary waveform;
   using factors of the primary average level as primary range limit comparison references;
   comparing each measured amplitude with the primary comparison references;
   collecting "less than" and "greater than" comparison outputs predetermined to identify the primary waveform within an acceptable tolerance range at each interval along the primary waveform for each ideal waveform; and
   signaling recognition of the unknown character if the primary waveform is within acceptable tolerance ranges of an ideal character waveform or signaling non-recognition if the primary waveform is not within acceptable tolerance ranges of any ideal character waveform.

2. The method as described in claim 1 wherein the unknown character is further sensed by a secondary read means, thereby producing a secondary waveform which is processed in the same fashion as the first waveform.

3. The method as described in claim 2 wherein the primary read means senses the unknown character vertically as the document passes thereby.

4. The method as described in claim 2 wherein the secondary read means senses the unknown character at a slanted angle from the vertical as the document passes thereby.

5. The method as described in claim 2 wherein the primary and the secondary read means are magnetic ink character recognition read heads.

6. The method as described in claim 2 wherein the primary and secondary read means are optical character recognition read heads.

7. A device for reading unknown document characters and recognizing the waveform of each unknown character, the device comprising:
 means for calculating and storing acceptable tolerance ranges of amplitude to average level ratios at each interval along the ideal waveform for each ideal character;
 a primary read head for sensing each individual unknown character at one orientation as a document passes thereby;
 means for producing a primary waveform from each unknown character sensed;
 means for measuring the amplitude of the primary waveform at timed intervals;
 means for calculating the average level of the amplitudes of the primary waveform;
 means for calculating factors of the primary average level for use a primary range limit comparison references;
 means for comparing each measured amplitude with the comparison references;
 means for collecting "less than" and "greater then" comparison outputs predetermined to identify the primary waveform within an acceptable tolerance range at each interval along the primary waveform for each ideal waveform; and
 means for signaling recognition or non-recognition of the primary waveform.

8. The device of claim 7 further comprising:
 a secondary read head means for sensing each individual unknown character at a different orientation from the first read head as the document passes thereby;
 means for producing a secondary waveform from each unknown character sensed;
 means for measuring the amplitude of the secondary waveform at timed intervals;
 means for calculating the secondary average level of the amplitudes of the secondary waveform;
 means for calculating factors of the secondary average level for use as secondary range limit comparison references;
 means for comparing each measured amplitude with the secondary comparison references;
 means for collecting "less than" and "greater than" comparison outputs predetermined to identify the secondary waveform within an acceptable tolerance range at each interval along the secondary waveform for each ideal waveform; and
 means for signaling recognition or non-recognition of the secondary waveform.

9. The device as described in claim 7 wherein the primary read head senses the unknown character vertically as the document passes thereby.

10. The device as described in claim 8 wherein the secondary read head is slanted at an angle from the vertical as the document passes thereby.

11. The device as described in claim 8 wherein the primary and secondary read heads are magnetic ink character recognition read heads.

12. The device as described in claim 8 wherein the primary and secondary read heads are optical character recognition read heads.

* * * * *

UNITED STATES PATENT AND TRADEMARK OFFICE
CERTIFICATE OF CORRECTION

PATENT NO. : 4,827,531

DATED : May 2, 1989

INVENTOR(S) : Richard E. Milford

It is certified that error appears in the above-identified patent and that said Letters Patent is hereby corrected as shown below:

On the Cover Page [56] References Cited, line 9, the inventor of U.S. 3,629,829 9/1969 "Ardswer" should read --Ordower--. In column 1, line 29, "determining for character" should read --determining character--. In column 2, line 67, "document passes" should read --document 12 passes--. In column 3, line 35, "higher then" should read --higher than--. In column 4, line 31, "FIG. 5A show" should read --FIG. 5A shows--; In column 5, lines 27, "references level at" should read --references at--. In column 6, line 2, "references level at" should read --references at--. In column 7, line 33, "register 132, 135" should read --register 132, 136--. In column 11, line 37, "greater then" should read "greater than".

Signed and Sealed this

Sixteenth Day of January, 1990

Attest:

JEFFREY M. SAMUELS

Attesting Officer     Acting Commissioner of Patents and Trademarks